United States Patent
Rackmil et al.

(10) Patent No.: US 10,801,383 B1
(45) Date of Patent: Oct. 13, 2020

(54) SYSTEM AND METHOD FOR CONTROLLING AN ENGINE

(71) Applicant: Tenneco Automotive Operating Company Inc., Lake Forest, IL (US)

(72) Inventors: Charles Rackmil, Ann Arbor, MI (US); Matthew Muhleck, Ann Arbor, MI (US); Tom Harris, Ann Arbor, MI (US); Timothy Gardner, Ann Arbor, MI (US); David L Anderson, Ann Arbor, MI (US); Pankaj Vazirani, Ann Arbor, MI (US); Adam Kotrba, Ann Arbor, MI (US)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 0 days.

(21) Appl. No.: 16/445,724

(22) Filed: Jun. 19, 2019

(51) Int. Cl.
| | |
|---|---|
| *F01N 3/02* | (2006.01) |
| *F01N 3/20* | (2006.01) |
| *F02D 13/06* | (2006.01) |
| *F02D 17/02* | (2006.01) |
| *F02D 41/00* | (2006.01) |
| *F02D 41/06* | (2006.01) |
| *F01N 3/025* | (2006.01) |

(Continued)

(52) U.S. Cl.
CPC ......... *F01N 3/2033* (2013.01); *F01N 3/0256* (2013.01); *F02D 13/06* (2013.01); *F02D 17/02* (2013.01); *F02D 41/0002* (2013.01); *F02D 41/064* (2013.01); *F02D 41/30* (2013.01); *F01N 2430/02* (2013.01); *F02D 2013/0292* (2013.01)

(58) Field of Classification Search
CPC ...... F02D 13/06; F02D 17/02; F02D 41/0087; F02D 41/0002; F02D 41/064; F02D 41/30; F02D 2013/0292; F01N 3/2033; F01N 3/0256; F01N 2430/02; Y02T 10/18; Y02T 10/47
USPC .................. 60/286, 295, 297, 299–301, 311; 123/58.8, 90.15, 481
See application file for complete search history.

(56) References Cited

U.S. PATENT DOCUMENTS

| | | |
|---|---|---|
| 3,800,772 A | 4/1974 | Gospodar |
| 4,165,610 A | 8/1979 | Iizuka et al. |
| 5,930,992 A | 8/1999 | Esch et al. |

(Continued)

FOREIGN PATENT DOCUMENTS

| | | |
|---|---|---|
| WO | 2008012453 | 1/2008 |

*Primary Examiner* — Thai Ba Trieu
*Assistant Examiner* — Dapinder Singh
(74) *Attorney, Agent, or Firm* — McGarry Bair PC

(57) ABSTRACT

A system includes an engine having multiple cylinders and an exhaust manifold. A fuel delivery device and an igniter are disposed in the exhaust manifold. The fuel delivery device injects a fuel into the exhaust manifold. The system also includes an exhaust aftertreatment setup in fluid communication with the exhaust manifold, and a controller in communication with the multiple cylinders, the fuel delivery device and the igniter. The controller is configured to deactivate at least one cylinder to provide air to the exhaust manifold, and control the fuel delivery device to provide the fuel within the exhaust manifold such that the fuel and the air from the at least one deactivated cylinder forms a mixture within the exhaust manifold. The controller is configured to control the igniter to ignite the mixture to generate combustion products within the exhaust manifold for heating the exhaust aftertreatment setup.

12 Claims, 3 Drawing Sheets

(51) Int. Cl.
*F02D 41/30* (2006.01)
*F02D 13/02* (2006.01)

(56) References Cited

U.S. PATENT DOCUMENTS

| | | |
|---|---|---|
| 6,931,839 B2 | 8/2005 | Foster |
| 7,028,476 B2* | 4/2006 | Proeschel ................. F02G 3/02 60/616 |
| 7,073,322 B2 | 7/2006 | Sumilla et al. |
| 7,308,872 B2 | 12/2007 | Sellnau et al. |
| 7,516,730 B2 | 4/2009 | Ukai et al. |
| 8,887,494 B2 | 11/2014 | Eller et al. |
| 8,943,803 B2 | 2/2015 | Pipis, Jr. |
| 9,784,199 B2 | 10/2017 | Glugla |
| 10,247,072 B2 | 4/2019 | Younkins et al. |
| 2016/0222898 A1* | 8/2016 | Ulrey ...................... F01N 9/002 |
| 2018/0058289 A1 | 3/2018 | Lee et al. |
| 2019/0136776 A1* | 5/2019 | Dudar ................... B60W 10/06 |
| 2020/0018197 A1* | 1/2020 | McCarthy, Jr. ......... F02D 13/06 |

* cited by examiner

SYSTEM AND METHOD FOR CONTROLLING AN ENGINE

TECHNICAL FIELD

The present disclosure relates to a system and a method for controlling an engine.

BACKGROUND

Conventional exhaust aftertreatment setups typically associated with compression ignition engines may include one or more aftertreatment devices, for instance, a Diesel Particulate Filter (DPF), a Diesel Oxidation Catalyst (DOC) and/or a Selective Catalytic Reductant (SCR). These conventional exhaust aftertreatment setups are provided for operatively rendering an exhaust stream free of noxious components, for example, Nitrous Oxides ($NO_x$), particulate matter and/or other unburnt hydrocarbons. Some components present in the aftertreatment device(s) may require supplemental heat as these components may need to be raised to an elevated activation temperature for achieving maximum conversion of the noxious components present in the exhaust stream of the engine.

Pursuant to improvements in noxious emissions reduction, various technological advancements have been made in recent years to the aftertreatment devices as well as system hardware that is typically associated with the aftertreatment devices. These advancements are directed towards improving the rate of conversion of noxious components by the aftertreatment devices. For example, a conventionally known thermal unit, such as an exhaust gas burner, may be installed in an exhaust passage of an engine and located upstream of the aftertreatment devices to heat the exhaust stream and increase its temperature, especially when the engine is started at ambient temperatures.

Such thermal units may be provided for regenerating components of the aftertreatment devices so that the aftertreatment devices can quickly achieve their rate of conversion of noxious components in the exhaust stream. However, as these thermal units typically require fuel and air via separate fuel and air feed systems, installing conventional thermal units in addition to the distinct fuel and air feed systems may render an overall assembly of the aftertreatment system bulky. Consequently, such a configuration of the aftertreatment system and its associated system hardware may become less than optimal for installation in areas that exhibit tight space constraints, for example, when retrofitting the exhaust gas burner and its associated fuel and air feed systems to an existing aftertreatment system.

SUMMARY

In an aspect of the present disclosure, a system includes an engine having a plurality of cylinders and an exhaust manifold in fluid communication with the cylinders. The system also includes a fuel delivery device and an igniter that are disposed, at least partially, in the exhaust manifold. The fuel delivery device is configured to inject a fuel into the exhaust manifold. The igniter is configured to ignite a mixture of the fuel and air. The system also includes an exhaust aftertreatment setup in fluid communication with the exhaust manifold, and a controller that is disposed in communication with the plurality of cylinders, the fuel delivery device and the igniter. The controller is configured to deactivate at least one cylinder from the plurality of cylinders to provide the air to the exhaust manifold. Further, the controller is configured to control the fuel delivery device to provide the fuel within the exhaust manifold such that the fuel from the fuel delivery device and the air from the at least one deactivated cylinder forms the mixture of the fuel and the air within the exhaust manifold. Furthermore, the controller is also configured to control the igniter to ignite the mixture of the fuel and the air to generate combustion products within the exhaust manifold for heating the exhaust aftertreatment setup.

In another aspect of the present disclosure, a method of controlling an engine is provided. The engine includes a plurality of cylinders and an exhaust manifold in fluid communication with the plurality of cylinders. The method includes deactivating at least one cylinder from the plurality of cylinders by controlling at least one of a fuel injector, an intake valve and an exhaust valve associated with the at least one cylinder. The method also includes injecting a fuel into the exhaust manifold by a fuel delivery device disposed within the exhaust manifold. The method also includes generating a mixture of the fuel and air by mixing the fuel from the fuel delivery device and the air discharged from the at least one deactivated cylinder. Further, the method also includes igniting the mixture of the fuel and the air by an igniter in order to generate combustion products within the exhaust manifold. Furthermore, the method also includes heating an exhaust aftertreatment setup by the combustion products.

In another aspect of the present disclosure, a system includes an engine having a plurality of cylinders and an exhaust manifold in fluid communication with the cylinders. The system also includes a fuel delivery device and an igniter that are disposed, at least partially, in the exhaust manifold. The fuel delivery device is configured to inject a fuel into the exhaust manifold. The igniter is configured to ignite a mixture of the fuel and air. The system also includes an exhaust aftertreatment setup in fluid communication with the exhaust manifold. The system further includes a controller that is disposed in communication with the plurality of cylinders, the fuel delivery device and the igniter. The controller is configured to deactivate at least one cylinder from the plurality of cylinders to provide the air to the exhaust manifold. Further, the controller is configured to control the fuel delivery device to provide the fuel within the exhaust manifold such that the fuel from the fuel delivery device and the air from the at least one deactivated cylinder forms the mixture of the fuel and the air within the exhaust manifold. Furthermore, the controller is also configured to control the igniter to ignite the mixture of the fuel and the air to generate combustion products within the exhaust manifold for heating the exhaust aftertreatment setup. The fuel delivery device and the igniter are located in a region of the exhaust manifold receiving the air from the at least one deactivated cylinder.

Other features and aspects of this disclosure will be apparent from the following description and the accompanying drawings.

DETAILED DESCRIPTION

Figure 1:
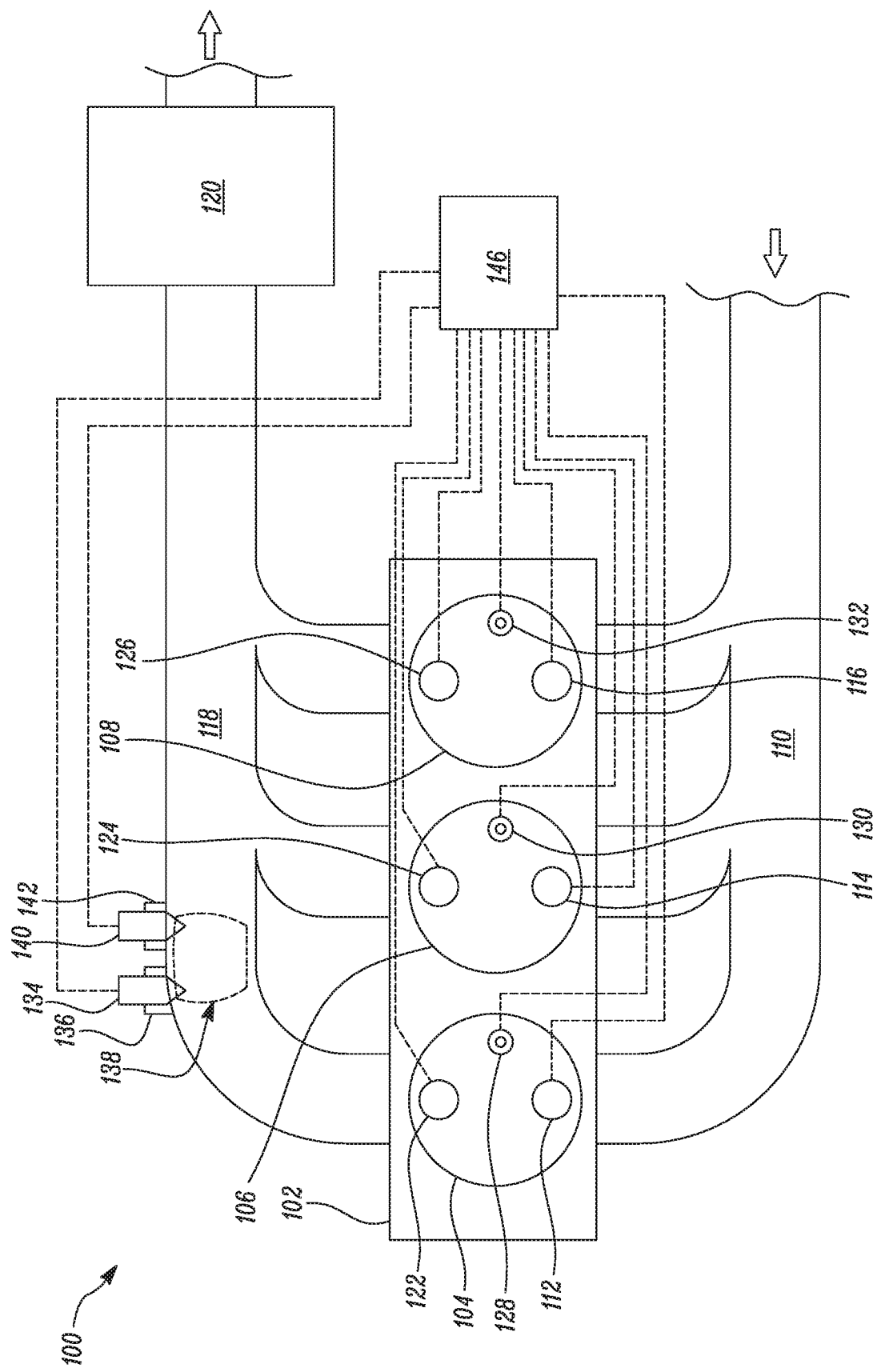
FIG. 1 is a schematic representation of an engine system, according to an aspect of the present disclosure.

Wherever possible, the same reference numbers will be used throughout the drawings to refer to same or like parts. Referring to FIG. 1, a schematic representation of an engine system 100 is illustrated. The engine system 100 includes an engine 102. The engine 102 may be any multi-cylinder internal combustion engine powered by a fuel, such as gasoline, diesel, natural gas, and so on, or a combination thereof. In some embodiments, the engine 102 is a compression ignition engine. The engine 102 includes a plurality of cylinders 104, 106, 108. In the illustrated embodiment, the engine 102 includes three cylinders 104, 106, 108. In other embodiments, the engine 102 may include any number of cylinders, based on application requirements. Also, in the illustrated embodiment, the engine 102 includes an inline cylinder configuration. In other embodiments, the engine 102 may include any alternative cylinder configuration, such as a V-configuration, and so on.

The engine 102 also includes an intake manifold 110. The intake manifold 110 is provided in fluid communication with each of the cylinders 104, 106, 108. The intake manifold 110 is adapted to provide a supply of air from atmosphere to each of the cylinders 104, 106, 108. The engine 102 also includes a number of intake valves 112, 114, 116. In the illustrated embodiment, the engine 102 includes three intake valves 112, 114, 116, such that the intake valve 112 is associated with the cylinder 104, the intake valve 114 is associated with the cylinder 106, and the intake valve 116 is associated with the cylinder 108. In other embodiments, the engine 102 may include multiple intake valves (not shown) associated with each of the cylinders 104, 106, 108, based on application requirements. Each of the intake valves 112, 114, 116 is provided in fluid communication with the intake manifold 110. Accordingly, each of the intake valves 112, 114, 116 is adapted to regulate the supply of the air from the intake manifold 110 to a corresponding cylinder 104, 106, 108 from the plurality of cylinders 104, 106, 108.

The engine 102 also includes an exhaust manifold 118. The exhaust manifold 118 is provided in fluid communication with each of the cylinders 104, 106, 108. The exhaust manifold 118 is adapted to provide a flow of exhaust gas from each of the cylinders 104, 106, 108 to a downstream component, such as an exhaust aftertreatment setup 120. The engine 102 also includes a number of exhaust valves 122, 124, 126. In the illustrated embodiment, the engine 102 includes three exhaust valves 122, 124, 126, such that the exhaust valve 122 is associated with the cylinder 104, the exhaust valve 124 is associated with the cylinder 106, and the exhaust valve 126 is associated with the cylinder 108. In other embodiments, the engine 102 may include multiple exhaust valves (not shown) associated with each of the cylinders 104, 106, 108, based on application requirements. Each of the exhaust valves 122, 124, 126 is provided in fluid communication with the exhaust manifold 118. Accordingly, each of the exhaust valves 122, 124, 126 is adapted to regulate a flow of fluid, such as the air or the exhaust gas, discharged by the corresponding cylinder 104, 106, 108 from the plurality of cylinders 104, 106, 108 into the exhaust manifold 118.

The engine 102 also includes a number of fuel injectors 128, 130, 132. In the illustrated embodiment, the engine 102 includes three fuel injectors 128, 130, 132, such that the fuel injector 128 is associated with the cylinder 104, the fuel injector 130 is associated with the cylinder 106, and the fuel injector 132 is associated with the cylinder 108. In other embodiments, the engine 102 may include multiple fuel injectors (not shown) associated with each of the cylinders 104, 106, 108, based on application requirements. Each of the fuel injectors 128, 130, 132 is associated with a fuel delivery system (not shown) associated with the engine 102. Accordingly, each of the fuel injectors 128, 130, 132 is adapted to regulate a supply of fuel to the corresponding cylinder 104, 106, 108 from the plurality of cylinders 104, 106, 108.

The engine system 100 also includes a fuel delivery device 134. The fuel delivery device 134 is disposed at least partially in the exhaust manifold 118. More specifically, the fuel delivery device 134 is disposed in a first port 136 provided on the exhaust manifold 118. Also, the fuel delivery device 134 is located in a region 138 of the exhaust manifold 118 receiving the air from at least one deactivated cylinder and will be explained hereinafter in more detail. In one embodiment, the fuel delivery device 134 may be associated with the fuel delivery system associated with each of the fuel injectors 128, 130, 132. In other embodiments, the fuel delivery device 134 may be associated with a dedicated fuel delivery system (not shown) separate from the fuel delivery system associated with each of the fuel injectors 128, 130, 132.

The fuel delivery device 134 is adapted to inject a fuel into the exhaust manifold 118. The fuel may be similar or different from the fuel associated with each of the fuel injectors 128, 130, 132. In one embodiment, the fuel delivery device 134 may be a fuel vaporizer adapted to inject a vaporized fuel into the exhaust manifold 118. In such a situation, the fuel delivery device 134 may be adapted to receive a liquid fuel and convert the liquid fuel into a gaseous fuel using thermal energy. In some embodiments, the fuel delivery device 134 may be a diesel fuel vaporizer that evaporates the diesel fuel using a glow plug and injects the evaporated diesel fuel into the exhaust manifold 118. The diesel fuel vaporizer may atomize the evaporated diesel fuel using a nozzle. In another embodiment, the fuel delivery device 134 may be any fuel delivery device adapted to receive, meter and deliver the liquid fuel into the exhaust manifold 118, for example, a fuel injector. In yet another embodiment, the fuel delivery device 134 may be a fuel injector with a mixer combination. In such a situation, the mixer may be any mixing element adapted to efficiently mix the fuel and the air in order to form an improved mixture of the fuel and the air. The mixer may be any mixing element, such as a plate type mixer, a baffle type mixer, a perforated type mixer, and so on, based on application requirements.

The engine system 100 also includes an igniter 140. The igniter 140 is disposed at least partially in the exhaust manifold 118. More specifically, the igniter 140 is disposed in a second port 142 provided on the exhaust manifold 118. Also, the igniter 140 is located in the region 138 of the exhaust manifold 118 receiving the air from the at least one deactivated cylinder. In the illustrated embodiment, the second port 142 is disposed downstream and adjacent to the first port 136. In other embodiments, the second port 142 may be disposed downstream and substantially away from the first port 136. In one embodiment, the igniter 140 may be associated with an ignition system (not shown) associated with the engine 102. In other embodiments, the igniter 140 may be associated with a dedicated ignition system (not shown) separate from the ignition system associated with the engine 102. The igniter 140 is adapted to ignite a mixture of the fuel and the air and generate combustion products. The igniter 140 may be any ignition device, such as a fuel igniter, a spark plug, and so on, adapted to ignite a combustible mixture.

The engine system 100 also includes the exhaust aftertreatment setup 120. The exhaust aftertreatment setup 120 is provided in fluid communication with the exhaust manifold 118. The exhaust aftertreatment setup 120 is adapted to receive the flow of the exhaust gas from the exhaust manifold 118 and treat the exhaust gas prior to discharging the exhaust gas to atmosphere. The exhaust aftertreatment setup 120 is also adapted to receive a flow of the combustion products from the exhaust manifold 118 for heating the exhaust aftertreatment setup 120, such as during a cold start, a regeneration event, and so on. The exhaust aftertreatment setup 120 may be any aftertreatment device, such as a Diesel Particulate Filter (DPF), a Diesel Oxidation Catalyst (DOC) unit, a Selective Catalytic Reduction (SCR) unit, and so on, or a combination thereof.

Figure 2:
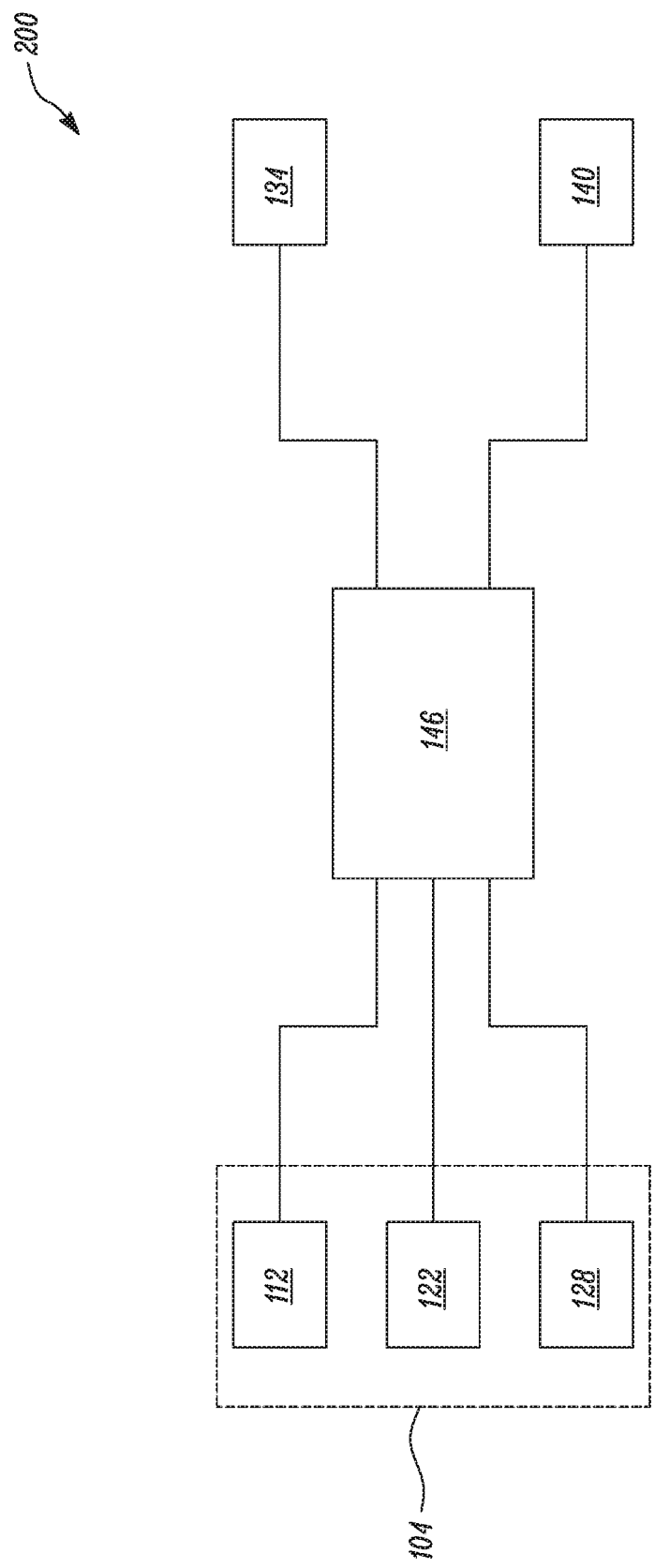
FIG. 2 is a schematic representation of a system for controlling an engine, according to an aspect of the present disclosure.

Referring to FIG. 2, a schematic representation of a system 200 for controlling the engine 102 is illustrated. The system 200 includes a controller 146 (also shown in FIG. 1). The controller 146 may be any control unit configured to perform various functions of the system 200. In one embodiment, the controller 146 may be a dedicated control unit configured to perform functions related to the system 200. In another embodiment, the controller 146 may be an Engine Control Unit (ECU) associated with the engine 102, a dedicated control unit associated with the system 200, and so on, configured to perform functions related to the system 200.

As shown in FIGS. 1 and 2, the controller 146 is disposed in communication with each of the cylinders 104, 106, 108, each of the intake valves 112, 114, 116, each of the exhaust valves 122, 124, 126, each of the fuel injectors 128, 130, 132, the fuel delivery device 134, and the igniter 140. The system 200 will now be described with reference to the cylinder 104, the intake valve 112, the exhaust valve 122, the fuel injector 128, the fuel delivery device 134, and the igniter 140. The controller 146 is configured to deactivate at least one cylinder 104, 106, 108 from the plurality of cylinders 104, 106, 108 to provide the air to the exhaust manifold 118. In the illustrated embodiment, the controller 146 is configured to deactivate the cylinder 104 from the plurality of cylinders 104, 106, 108 to provide the air to the exhaust manifold 118. More specifically, the controller 146 is configured to control at least one of the fuel injector 128, the intake valve 112 and the exhaust valve 122 associated with the corresponding cylinder 104 from the plurality of cylinders 104, 106, 108 for deactivating the at least one cylinder 104. In some embodiments, the controller 146 deactivates the cylinder 104 when heating of the exhaust treatment setup 120 is required, for example, during starting of the engine 102.

In some embodiments, the controller 146 is configured to deactivate the fuel injector 128 of the cylinder 104. Deactivating the fuel injector 128 may cutoff the supply of fuel to the cylinder 104. Also, the controller 146 is configured to control an opening of the intake valve 112 to regulate the supply of the air to the cylinder 104. As such, a relatively smaller opening of the intake valve 112 may provide a relatively less supply of the air to the cylinder 104, and a relative greater opening of the intake valve 112 may provide a relatively higher supply of the air to the cylinder 104. Further, the controller 146 is configured to open the exhaust valve 122. As such, based on the opening of the exhaust valve 122, the supply of the air is provided to the exhaust manifold 118 in the region 138 having the fuel delivery device 134 and the igniter 140. It should be noted that, in some embodiments, the controller 146 may be configured to control an opening of the exhaust valve 122 in order to control a volume of the air supplied from the cylinder 104 to the exhaust manifold 118, based on application requirements.

The controller 146 is also configured to control the fuel delivery device 134 to provide the fuel within the exhaust manifold 118. As such, the fuel is provided in the region 138 of the exhaust manifold 118. The fuel from the fuel delivery device 134 and the air from the deactivated cylinder 104 forms the mixture of the fuel and the air within the exhaust manifold 118. As such, the mixture of the fuel and the air is formed in the region 138 of the exhaust manifold 118. The controller 146 is further configured to control the igniter 140 to ignite the mixture of the fuel and the air to generate the combustion products. As such, the combustion products are generated in the region 138 within the exhaust manifold 118 for heating the exhaust aftertreatment setup 120.

Figure 3:
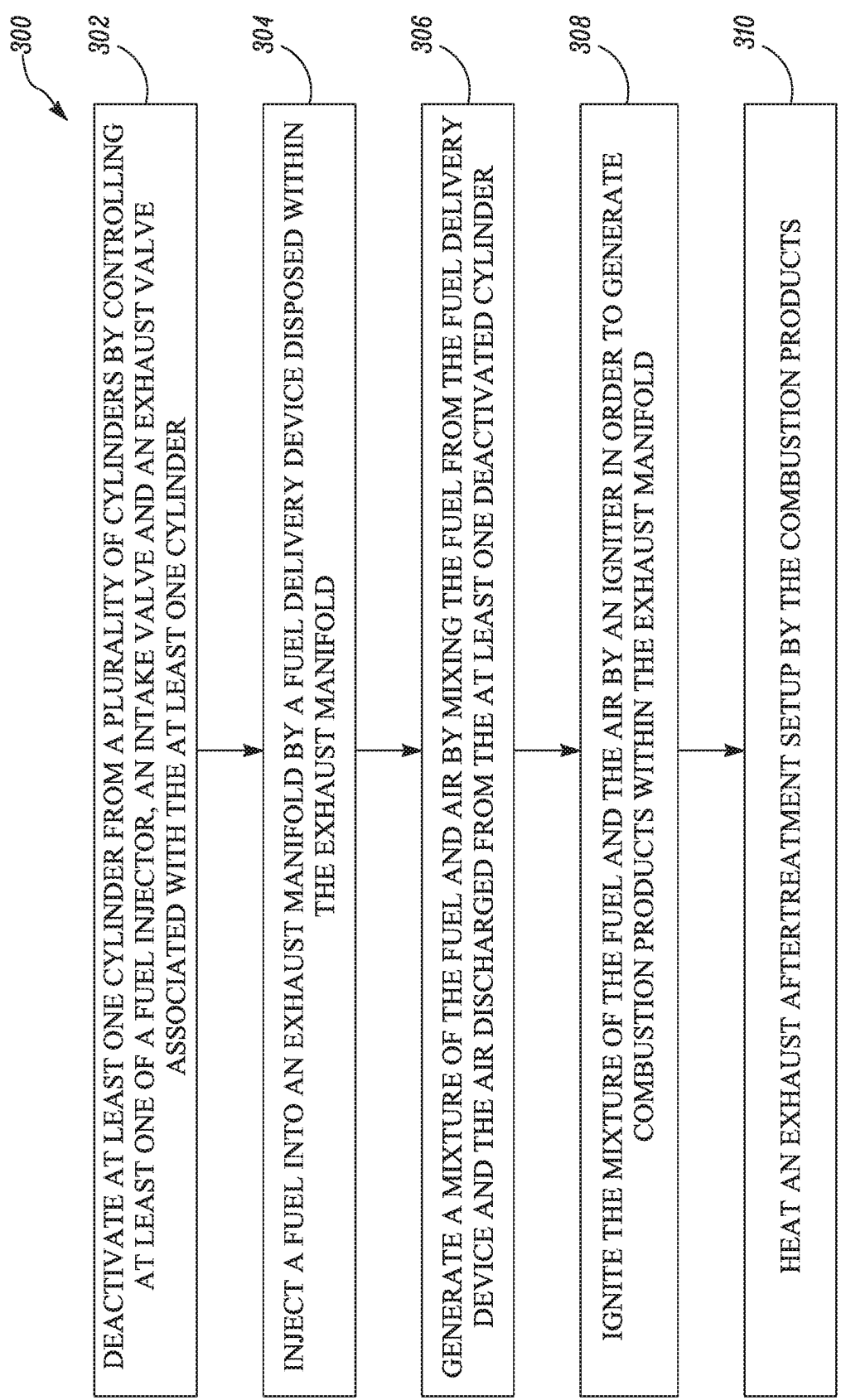
FIG. 3 is a flowchart of a method of controlling the engine, according to an aspect of the present disclosure.

Referring to FIG. 3, a flowchart of a method 300 of controlling the engine 102 is illustrated. At step 302, at least one cylinder 104 is deactivated by the controller 146 from the plurality of cylinders 104, 106, 108 by controlling at least one of the fuel injector 128, the intake valve 112 and the exhaust valve 122 associated with the cylinder 104. More specifically, the cylinder 104 is deactivated by the controller 146 during starting of the engine 102 by controlling one or more of the fuel injector 128, the intake valve 112 and the exhaust valve 122 associated with the cylinder 104. For example, the controller 146 deactivates the fuel injector 128 of the cylinder 104 in order to limit the flow of the fuel to the cylinder 104. The controller 146 also controls the opening of the intake valve 112 in order to regulate the supply of the air to the cylinder 104. The controller 146 further controls the opening the exhaust valve 122 in order to control the flow of the air from the cylinder 104 into the region 138 of the exhaust manifold 118.

At step 304, the fuel is injected into the exhaust manifold 118 by the fuel delivery device 134 disposed within the exhaust manifold 118. More specifically, the fuel delivery device 134 is received through the first port 136 of the exhaust manifold 118 and is controlled by the controller 146 in order to inject the fuel in the region 138 of the exhaust manifold 118 receiving the air from the deactivated cylinder 104. At step 306, the mixture of the fuel and the air is generated by mixing the fuel from the fuel delivery device 134 and the air discharged from the deactivated cylinder 104. More specifically, the mixture of the fuel and the air is generated in the region 138 of the exhaust manifold 118.

At step 308, the mixture of the fuel and the air is ignited by the igniter 140 in order to generate the combustion products within the exhaust manifold 118. More specifically, the igniter 140 is received through the second port 142 of the exhaust manifold 118 and is controlled by the controller 146 in order to ignite the mixture of the fuel and the air and generate the combustion products in the region 138 of the exhaust manifold 118 receiving the air from the deactivated cylinder 104. At step 310, the exhaust aftertreatment setup 120 is heated by the combustion products. As such, the exhaust aftertreatment setup 120 may be heated to the desired temperature during a cold start of the engine system 100, a regeneration event of the exhaust aftertreatment setup 120, and so on. In some embodiments, the controller 146 may control heating of the exhaust aftertreatment setup 120 based on signals received from one or more sensors (not shown), such as temperature sensors, Nitrogen Oxide (NOx) sensors, pressure sensors, flowrate sensors, and so forth.

It should be noted that although the system 200 and the method 300 is described herein with reference to the cylinder 104, the system 200 and the method 300 may function in a similar manner with reference to any of the cylinders 106, 108. As such, each of the fuel delivery device 134 and the igniter 140 may be disposed in a region (not shown) on the exhaust manifold 118, such that the region may be adjacent to the corresponding cylinder 106, 108, based on application requirements. In some embodiments, the engine system 100 may include multiple pairs (not shown) of the fuel delivery device 134 and the igniter 140, such that each of the multiple pairs may be disposed in the region adjacent to the corresponding cylinder 106, 108. In such a situation, the system 200 may activate one or more of the multiple pairs of the fuel delivery device 134 and the igniter 140 in order to generate the combustion products within the exhaust manifold 118 and, thus, heat the exhaust aftertreatment setup 120.

The fuel delivery device 134 provides the fuel within the exhaust manifold 118 resulting in improved mixing with the air from the deactivated cylinder 104. The air from the deactivated cylinder 104 provides a relatively higher oxygen level in the mixture, in turn, providing improved combustion efficiency. Further, the igniter 140 provides improved combustion of the mixture of the fuel and the air, in turn, limiting uneven temperature gradient within the exhaust aftertreatment setup 120, limiting generation of unevenly distributed cold and/or hot spots within the exhaust aftertreatment setup 120, and improving an overall life of the exhaust aftertreatment setup 120.

Also, the system 200 and the method 300 does not require over fuelling of active cylinders 106, 108 which may result in dilution of the fuel in oil. As such, the fuel is delivered directly at the combustion site, viz. the region 138, in turn, optimizing ignitability, combustion, and emissions. In the illustrated embodiment, the region 138 is located in the exhaust manifold 118 upstream of each of the cylinders 106, 108. As such, the region 138 receives fresh air from the cylinder 104 without mixing with exhaust gas from one or more of the cylinders 106, 108, in turn, optimizing ignitability, combustion, and emissions. In some situations, deactivating the cylinder 104 while continuing activation or firing of the cylinders 106, 108 results in substantial cycle to cycle torque transients and idle instability of the engine 102. The torque transients and the idle instability may be controlled through variable valve actuation of any of the intake valves 112, 114, 116 and/or the exhaust valves 122, 124, 126, based on application requirements and known variable valve actuation methods.

The engine system 100 and the system 200 provide a simple, efficient, and cost-effective method for controlling the engine 102 and providing an active thermal management for the exhaust aftertreatment setup 120. The engine system 100 and the system 200 eliminate a need for a separate Cold Start Thermal Unit (CSTU) burner within the exhaust manifold 118, in turn, reducing system bulk, system footprint, system complexity, and system cost. The system 200 may be retrofitted in any engine system, including gasoline powered engines, diesel powered engines, natural gas-powered engines, dual fuel powered engines, and so on, with little or no modification to the existing system, in turn, providing wide system compatibility and usability.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A system comprising:
    an engine comprising a plurality of cylinders and an exhaust manifold in fluid communication with the plurality of cylinders;
    a fuel delivery device disposed at least partially in the exhaust manifold, the fuel delivery device configured to inject a fuel into the exhaust manifold;
    an igniter disposed at least partially in the exhaust manifold, the igniter configured to ignite a mixture of the fuel and air within the exhaust manifold;
    an exhaust aftertreatment setup in fluid communication with the exhaust manifold; and
    a controller disposed in communication with the plurality of cylinders, the fuel delivery device and the igniter, the controller configured to:
        deactivate at least one cylinder from the plurality of cylinders to provide the air to the exhaust manifold;
        control the fuel delivery device to provide the fuel within the exhaust manifold, the fuel from the fuel delivery device and the air from the at least one deactivated cylinder forming the mixture of the fuel and the air within the exhaust manifold; and
        control the igniter to ignite the mixture of the fuel and the air to generate combustion products within the exhaust manifold for heating the exhaust aftertreatment setup,
    wherein the fuel delivery device and the igniter are located in a region of the exhaust manifold receiving the air directly from the at least one deactivated cylinder.

2. The system of claim 1 further comprising a fuel injector, an intake valve and an exhaust valve associated with each cylinder from the plurality of cylinders, wherein the fuel injector is configured to regulate a supply of fuel to a corresponding cylinder from the plurality of cylinders, the intake valve is configured to regulate a supply of the air to the corresponding cylinder from the plurality of cylinders and the exhaust valve is configured to regulate an amount of fluid discharged by the corresponding cylinder from the plurality of cylinders, and wherein the controller is further configured to control at least one of the fuel injector, the intake valve and the exhaust valve associated with the corresponding cylinder from the plurality of cylinders for deactivating the at least one cylinder.

3. The system of claim 2, wherein the controller is further configured to deactivate the at least one cylinder during starting of the engine by at least one of:
    deactivating the fuel injector of the at least one cylinder; and
    controlling an opening of each of the intake valve and the exhaust valve to regulate the supply of the air to the at least one cylinder and the exhaust manifold.

4. The system of claim 1, wherein the fuel delivery device and the igniter are located in a region of the exhaust manifold receiving the air from the at least one deactivated cylinder.

5. The system of claim 1, wherein the exhaust manifold comprises a first port for receiving the fuel delivery device and a second port for receiving the igniter.

6. The system of claim 1, wherein the fuel delivery device is a fuel vaporizer or an injector with a mixer combination configured to deliver a vaporized fuel into the exhaust manifold.

7. A method of controlling an engine having a plurality of cylinders and an exhaust manifold in fluid communication with the plurality of cylinders, the method comprising:

deactivating at least one cylinder from the plurality of cylinders by controlling at least one of a fuel injector, an intake valve and an exhaust valve associated with the at least one cylinder;

injecting a fuel into the exhaust manifold by a fuel delivery device disposed within the exhaust manifold;

generating a mixture of the fuel and air by mixing the fuel from the fuel delivery device and the air discharged from the at least one deactivated cylinder;

igniting the mixture of the fuel and the air by an igniter in order to generate combustion products within the exhaust manifold; and heating an exhaust aftertreatment setup by the combustion products.

8. The method of claim 7, wherein the at least one cylinder is deactivated during starting of the engine, and wherein deactivating the at least one cylinder further comprises at least one of:

deactivating the fuel injector of the at least one cylinder; and controlling an opening of each of the intake valve and the exhaust valve to regulate a supply of the air to the at least one cylinder and the exhaust manifold.

9. The method of claim 7 further comprising providing the fuel delivery device and the igniter in a region of the exhaust manifold receiving the air from the at least one deactivated cylinder.

10. The method of claim 7 further comprising receiving the fuel delivery device through a first port of the exhaust manifold.

11. The method of claim 7 further comprising receiving the igniter through a second port of the exhaust manifold.

12. The method of claim 7, wherein the fuel delivery device is a fuel vaporizer or an injector with a mixer combination configured to deliver a vaporized fuel into the exhaust manifold.

\* \* \* \* \*